(12) United States Patent
Vernick (10) Patent No.: US 8,970,651 B2
(45) Date of Patent: Mar. 3, 2015

(54) INTEGRATING AUDIO AND VIDEO CONFERENCING CAPABILITIES

(71) Applicant: Avaya Inc., Basking Ridge, NJ (US)

(72) Inventor: Michael Vernick, Ocean, NJ (US)

(73) Assignee: Avaya Inc., Basking Ridge, NJ (US)

(*) Notice: Subject to any disclaimer, the term of this patent is extended or adjusted under 35 U.S.C. 154(b) by 139 days.

(21) Appl. No.: 13/715,130

(22) Filed: Dec. 14, 2012

(65) Prior Publication Data

US 2014/0168345 A1 Jun. 19, 2014

(51) Int. Cl.
*H04N 5/04* (2006.01)
*H04N 7/14* (2006.01)
*H04N 7/15* (2006.01)

(52) U.S. Cl.
CPC . *H04N 7/147* (2013.01); *H04N 7/15* (2013.01)
USPC ............. 348/14.02; 345/473; 348/14.08; 348/14.09; 370/352; 370/509; 704/233; 709/204; 709/227; 713/400

(58) Field of Classification Search
CPC ......... H04N 7/15; H04M 3/567; H04M 7/006
USPC ......... 345/190, 473; 348/14.02, 14.08, 14.09; 370/352, 509; 709/227, 204; 713/400; 704/233
See application file for complete search history.

(56) References Cited

U.S. PATENT DOCUMENTS

| | | | | |
|---|---|---|---|---|
| 5,491,498 A | * | 2/1996 | Koyama et al. | 345/519 |
| 6,181,693 B1 | * | 1/2001 | Maresca | 370/352 |
| 6,275,239 B1 | * | 8/2001 | Ezer et al. | 345/473 |
| 6,708,176 B2 | * | 3/2004 | Strunk et al. | 1/1 |
| 7,573,868 B2 | * | 8/2009 | Cutler et al. | 370/352 |
| 7,639,716 B2 | * | 12/2009 | Murphy et al. | 370/509 |
| 7,765,302 B2 | * | 7/2010 | Whynot et al. | 709/227 |
| 8,225,127 B2 | * | 7/2012 | Vonog et al. | 713/400 |
| 8,289,367 B2 | * | 10/2012 | Graham et al. | 348/14.09 |
| 8,416,281 B2 | * | 4/2013 | Ogle et al. | 348/14.09 |
| 8,849,660 B2 | * | 9/2014 | Rodriguez et al. | 704/233 |
| 8,856,231 B2 | * | 10/2014 | Saito et al. | 709/204 |
| 2007/0200925 A1 | * | 8/2007 | Kim | 348/14.08 |
| 2014/0168345 A1 | * | 6/2014 | Vernick | 348/14.02 |

\* cited by examiner

*Primary Examiner* — Gerald Gauthier (57) ABSTRACT

Systems, methods, and computer-readable storage media for adding video to an audio only communication session. During a communication session between a first device and a second device, the first device receives an audio portion of the communication session from a user. The first device then receives, via a wireless connection, a video portion of the communication session from a third device. The first device synchronizes the audio portion of the communication session and the video portion of the communication session to yield a synchronized audio and video portion of the communication session. Next, the first device sends the synchronized audio and video portion of the communication session to the second device.

20 Claims, 6 Drawing Sheets

INTEGRATING AUDIO AND VIDEO CONFERENCING CAPABILITIES

BACKGROUND

1. Technical Field

The present disclosure relates to video conferencing and more specifically to integrating audio and video conferencing capabilities.

2. Introduction

Most video conferencing systems are "all-in-one" devices. These systems often require wired connections between the various components, such as microphones, speakers, monitors, and cameras. In certain cases, recent wireless technologies, such as Wireless HDMI and Wireless USB, allow some of these components to be connected wirelessly. However, these wireless connections are generally fixed between the wirelessly-connected components, and therefore restrict mobility. Moreover, since most devices, such as computers and phones, do not typically have built-in Wireless HDMI or Wireless USB capabilities, they require hardware "dongles" or adapters to provide wireless connectivity with other components. This greatly complicates matters for the user.

Also, current video conferencing systems do not utilize other new and powerful wireless technologies, such as WIFI direct, to integrate different devices or components. Moreover, current solutions fail to use wireless capabilities to provide greater mobility while allowing devices to seamlessly integrate other devices during a conference and automatically extend the conferencing capabilities utilized during the conference. For example, current solutions do not allow an audio-only conferencing device to automatically add video conferencing to an audio conference when the audio-only conferencing device enters the vicinity of a video conferencing device with wireless capabilities. With current solutions, if a user is on an audio-only call through a mobile phone and the user wishes to add high quality video beyond the capabilities of the mobile phone, the user must manually transfer or reestablish the entire call on another device.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to wirelessly integrate different devices and components in a conferencing system. Using powerful wireless capabilities, these approaches provide users great mobility when conferencing, and allow conferencing devices to seamlessly integrate other devices during the conference and automatically extend media capabilities utilized during the conference. For example, a user participating in an audio-only conference through an audio-only phone can automatically add high quality video to the conference by wirelessly connecting to a nearby device with video capabilities. If the user wants to move to a different location, she can automatically transfer the video portion of the conference wirelessly to another nearby device with video capabilities. On the other hand, if the user does not want to move to a different location, but simply wants to transfer the video portion of the conference to a different device with better video capabilities, she can automatically do so via a wireless connection, without transferring or reestablishing the entire call.

Disclosed are systems, methods, and non-transitory computer-readable storage media for integrating audio and video conferencing capabilities. During a communication session between a first device and a second device, the first device receives an audio portion of the communication session from a user. The first device then receives, via a wireless connection, a video portion of the communication session from a third device. The first device can establish the communication session as an audio only communication session and subsequently send a message to the third device to initialize video input and output to establish video capabilities for the communication session. The video portion of the communication session can include compressed video frames captured by a camera associated with the third device, such as an internal camera or an external camera. The third device can be any device with wireless capabilities. For example, the third device can be a wireless conferencing gateway that transmits video frames captured from a camera device to the first device. The third device can also include a video encoder/decoder, a camera, a wireless interface, and/or a video output. The wireless connection can be, for example, a direct wireless connection between the devices. The direct wireless connection can be based on the 802.11 standards, for example. Here, the devices can directly connect to each other using a wireless standard such as WIFI Direct. Moreover, the devices can do wireless pairing to allow the devices to seamlessly communicate with each other.

Then, the first device synchronizes the audio portion of the communication session and the video portion of the communication session to yield a synchronized audio and video portion of the communication session. To synchronize the audio and video portions of the communication session, the first device can set lip synchronization attributes on the video portion of the communication session with audio from the audio portion of the communication session. Next, the first device sends the synchronized audio and video portion of the communication session to the second device. If the first device receives video and/or audio frames associated with the communication session from the second device, the first device can check lip synchronization attributes on the video frames and, at a time that is based at least in part on the lip synchronization attributes, send the video frames to the third device to be decoded and displayed at the third device. Accordingly, the third device can display the video frames received from the second device while the first device outputs corresponding audio frames received from the second device.

Lip synchronization can be achieved by periodically synchronizing the clocks between multiple devices. Using well known algorithms, one device can act as a master and the other devices can act as slaves, where the master and slaves exchange network messages to synchronize their clocks. Thus, for example, the first device and the third device can periodically synchronize their clocks for lip synchronization. Using well known algorithms, the first device or the third device can act as a master device while the other device can act as a slave device. The master device (e.g., the first device) and the slave device (e.g., the third device) can then exchange network messages to synchronize their clocks in order to perform lip synchronization based on the lip synchronization attributes.

The first device can also receive additional portions of the communication session from other devices in addition to the third device. For example, if the user of the first device wants to move to a location beyond the wireless range of the third device, or if the user simply wants to display the video of the communication session at a different display device, the user can do so by wirelessly connecting the first device to a fourth device with wireless capabilities. Here, the first device can receive a second portion of the communication session from the fourth device, synchronize the second video portion of the communication session and a corresponding audio portion of the communication session, and send the synchronized audio and video portion of the communication session to the second device. The first device can wirelessly connect to the third and/or fourth device when the first device detects that the third and/or fourth device is/are within wireless range of the system. The first device can also connect to other wireless devices to receive video portions as the user moves to different locations or prompts the first device to establish the connection, for example.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure addresses for wirelessly integrating audio and video conferencing capabilities. A system, method and computer-readable media are disclosed which integrate audio and video conferencing capabilities. A brief introductory description of a basic general purpose system or computing device in FIG. 1, which can be employed to practice the concepts, is disclosed herein. A more detailed description and variations of wirelessly integrating audio and video conferencing capabilities will then follow. These variations shall be described herein as the various embodiments are set forth. The disclosure now turns to FIG. 1.

Figure 1:
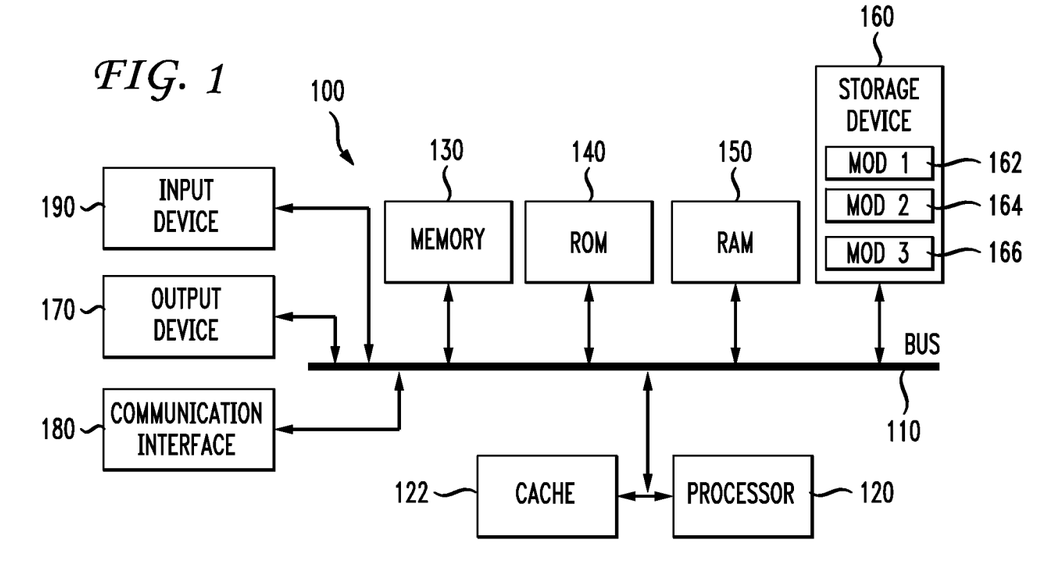
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
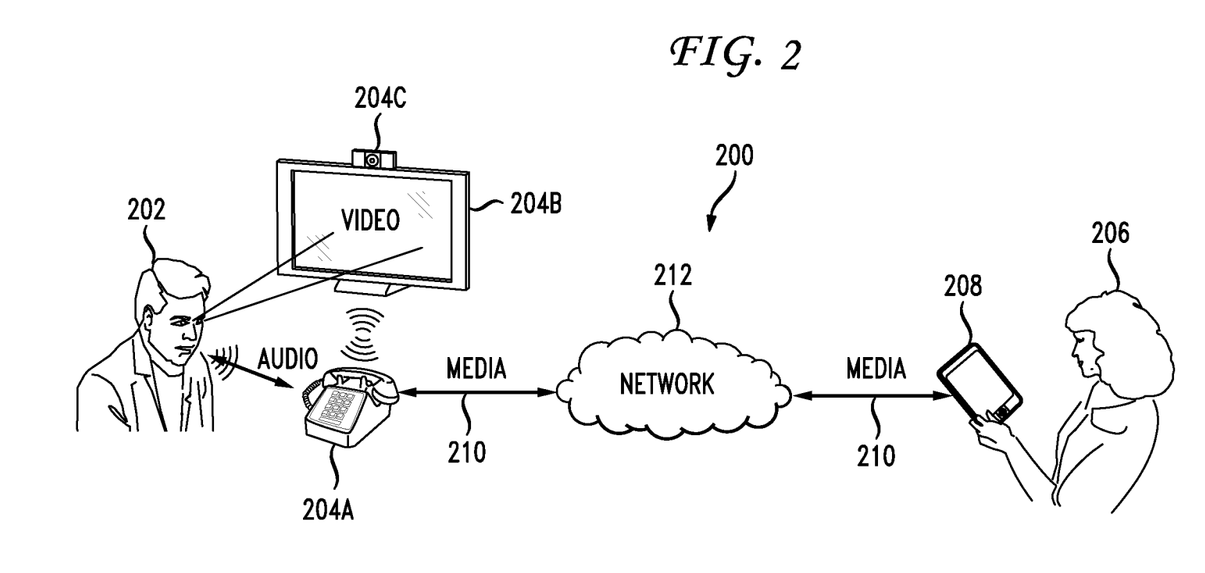
FIG. 2 illustrates an exemplary system for wirelessly integrating audio and video conferencing capabilities.

Having disclosed some components of a computing system, the disclosure now turns to FIG. 2, which illustrates an exemplary system 200 for wirelessly integrating audio and video conferencing capabilities. Here, user 202 can start an audio call with user 206 using the phone 204A. In some embodiments, user 202 can otherwise start the audio call with user 206 using any other device with networking capabilities, such as a laptop, a portable media player, an IP television, a conferencing system, a tablet computer, a media device, an electronic reader, etc. In FIG. 2, the phone 204A connects to the media device 208, used by the remote user 206, via the network 212. The network 212 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network. The media device 208 can be any device with networking capabilities, such as a laptop, a portable media player, an IP television, a conferencing system, a tablet computer, a media device, an electronic reader, and so forth.

If the user 202 decides to add video to the call, she can do so via the display device 204B and the wireless conferencing gateway 204C, without having to transfer or reestablish the entire call. Here, the user 202 can use the display device 204B to display video frames sent by the remote user 206 from the media device 208 as part of the video portion of the call. The user 202 can also use the wireless conferencing gateway 204C to capture video frames and send the video frames to the remote user 206, as part of the video portion of the call. The user 202 can add video to the call before establishing the call or at any point during the call. Once the user 202 adds video to the call, she can subsequently change which device(s) capture, display, and manage the video portion of the call at any point during the call.

To add video to a call, the phone 204A can, either before or during the call, wirelessly connect to the wireless conferencing gateway 204C, which provides the video conferencing capabilities. The phone 204A and wireless conferencing gateway 204C can directly connect with each other over wireless. Here, the display device 204B and/or the wireless conferencing gateway 204C do not have to be connected to the network 212, as they can communicate directly with the phone 204A over WiFi, for example. The phone 204A and wireless conferencing gateway 204C can automatically connect directly with each other over wireless when the devices are within a wireless range. For example, the phone 204A and wireless conferencing gateway 204C can automatically establish a direct wireless connection via a wireless connection based on the 802.11 standards, such as WIFI direct. Also, the phone 204A and wireless conferencing gateway 204C can automatically connect based on preconfigured settings and/or input from the user 202. Moreover, the phone 204A can present a prompt, such as an audio prompt, to the user 202 requesting permission to connect to the wireless conferencing gateway 204C when the phone 204A detects that the wireless conferencing gateway 204C is within a wireless range. The phone 204A can then connect to the wireless conferencing gateway 204C when the user grants the phone 204A permission to connect to the wireless conferencing gateway 204C, in response to the prompt. Alternatively, the phone 204A can automatically connect to the wireless conferencing gateway 204C when it detects that the wireless conferencing gateway 204C is within a wireless range, without presenting a prompt to the user 202. In one embodiment, the phone 204A and the wireless conferencing gateway 204C establish an application-level WIFI direct connection and directly communicate over a standard IP connection. The phone 204A and wireless conferencing gateway 204C can "see" each other using standard WIFI protocols. Moreover, the phone 204A and wireless conferencing gateway 204C can include a WIFI direct service application, which they can use to exchange information, such as information regarding security, video codec, framerate, resolution, hardware capabilities, software capabilities, etc.

The wireless conferencing gateway 204C can send video frames captured by a camera on the wireless conferencing gateway 204C to the phone 204A, which the phone 204A can then transmit to the media device 208 as part of the video portion of the call. In some embodiments, the wireless conferencing gateway 204C has a built-in camera which captures the video frames to be sent to the phone 204A. In other embodiments, the camera is a device separate from the wireless conferencing gateway 204C. Here, the wireless conferencing gateway 204C receives the video frames from the camera, and relays the video frames to the phone 204A. The wireless conferencing gateway 204C can compress and encode the video frames and send the video frames to the phone 204A for transmission to the remote user 206. The phone 204A can then append network headers to the video frames, set lip synchronization attributes with audio from the user 202, and send the video frames to the remote user 206.

The wireless conferencing gateway 204C also receives video frames sent by the phone 204A and originating from the media device 208 used by the remote user 206, and transmits the video frames to the display 204B for display. The phone 204A can synchronize the video frames with audio from the audio frames and, at an appropriate time, send the video frames to the wireless conferencing gateway 204C to be decoded and displayed on the display 204B. The wireless conferencing gateway 204C includes a video decoder/encoder and a video output to allow the video frames from the remote user 206 to be outputted to a display.

Figure 3:
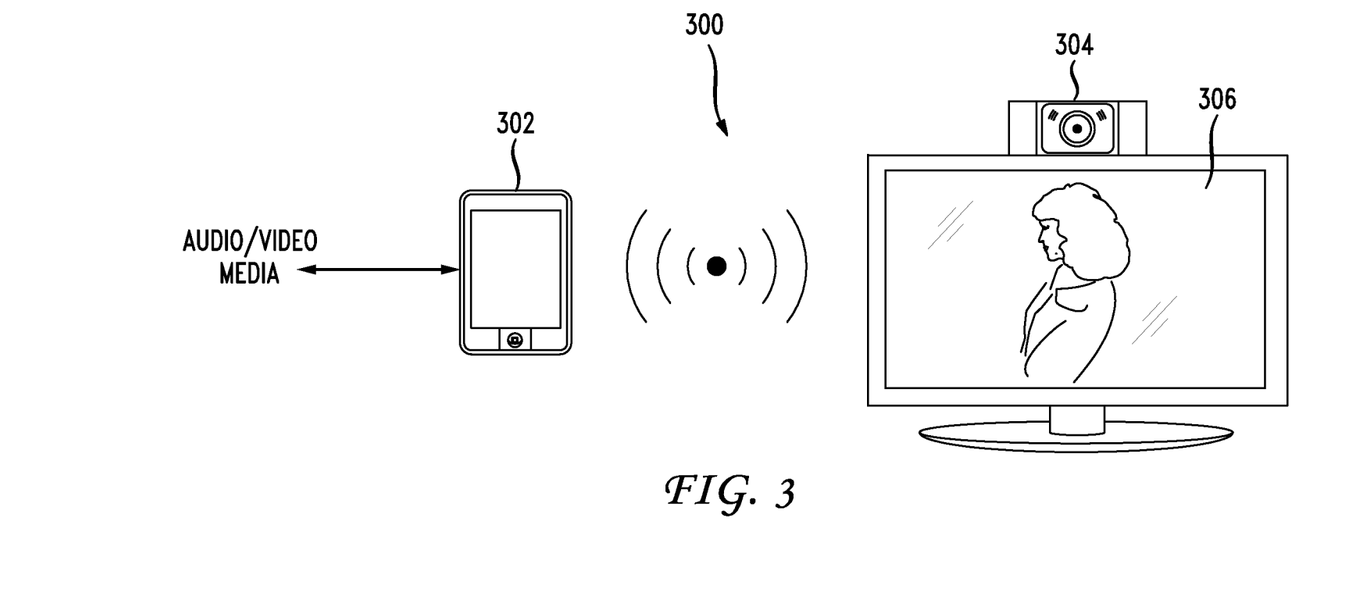
FIG. 3 illustrates an example of multiple wireless devices connected to form a single video conferencing endpoint.

FIG. 3 illustrates an example of multiple wireless devices connected to form a single video conferencing endpoint 300. The single video conferencing endpoint 300 includes a mobile phone 302, a wireless conference box 304, and a display 306. The mobile phone 302 and wireless conference box 304 communicate over a direct wireless connection based on 802.11 standards, such as WIFI direct. Moreover, the wireless conference box 304 and display 306 can communicate using any mechanism and/or interface suitable for transferring video data, such as HDMI, VGA, DVI, S-Video, wireless HDMI, WIFI, etc.

In FIG. 3, the mobile phone 302 receives audio and video media from the remote party in the conference call, outputs the audio through speakers on the mobile phone 302, and relays the video frames to the wireless conference box 304. The mobile phone 302 checks the lip synchronization attributes on the video frames to determine when to send the video frames to the wireless conference box 304, so the video frames can be timely decoded and displayed at the display 306. In particular, the mobile phone 302 receives the audio and video media from the remote party via a network, such as the Internet, a wireless network, an enterprise network, a LAN, a WAN, etc. The mobile phone 302 then sends the video frames to the wireless conference box 304 over a direct wireless connection, such as WIFI direct. The wireless conference box 304 receives the video frames from the mobile phone 302, decodes the video frames, and transmits the decoded video frames to the display 306 for presentation at the display 306.

The wireless conference box 304 includes a camera for capturing video to be transmitted to the remote party in the conference call. Moreover, the wireless conference box 304 sends compressed video frames from the camera to the mobile phone 302. The wireless conference box 304 can encode the video frames according to a suitable video compression standard, such as H.264. The mobile phone 302 receives the video frames from the wireless conference box 304, synchronizes the video frames and audio from the user, and sends the synchronized video and audio media to the remote party in the conference call. In one embodiment, the mobile phone 302 receives the video frames from the wireless conference box 304, appends network headers, sets lip synchronization attributes with audio from the user, and sends the video frames to the remote party in the conference call.

Although the video conferencing endpoint 300 in FIG. 3 includes a mobile phone 302, a wireless conference box 304, and a display 306, those of skill in the art can understand that the video conferencing endpoint 300 can include other devices. For example, the video conferencing endpoint 300 can include additional wireless conferencing boxes and/or displays to allow the user to transfer the video from the conference call to other devices if necessary based on the user's location and/or video requirements.

Figure 4:
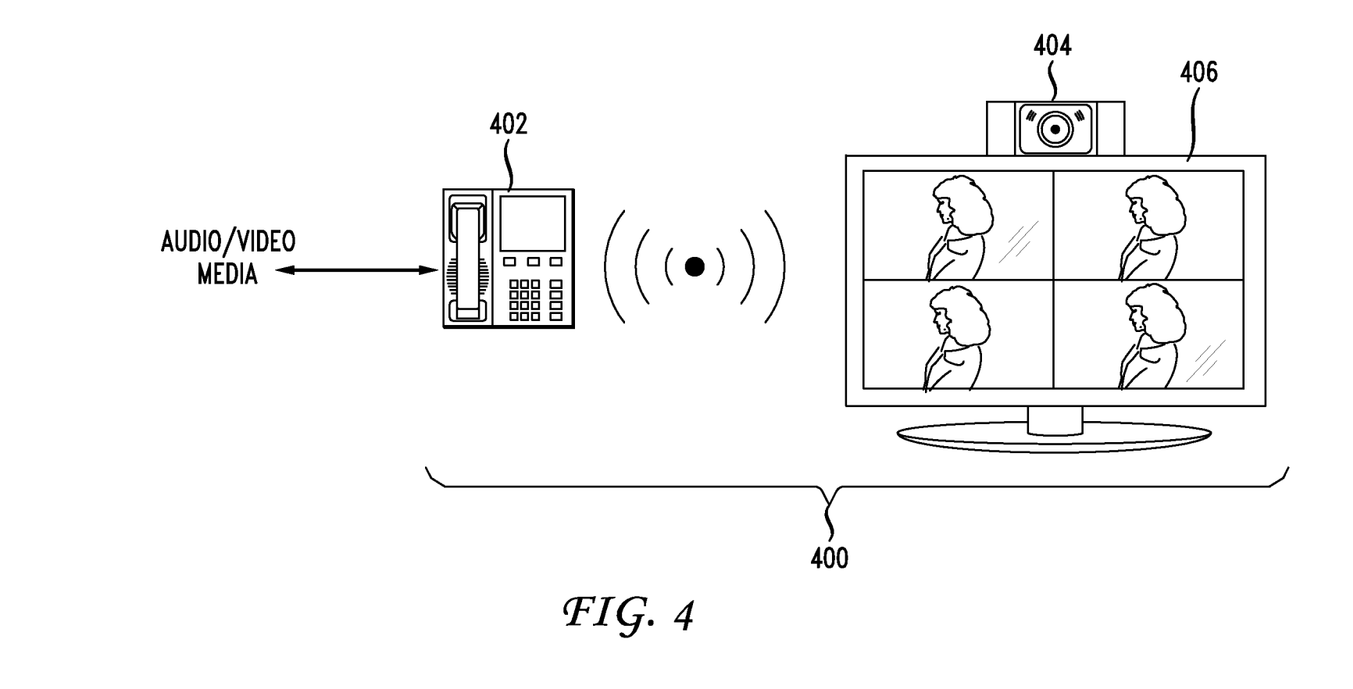
FIG. 4 illustrates an exemplary mechanism for adding a multiparty video conference to a desktop phone.

FIG. 4 illustrates an exemplary mechanism for adding a multiparty video conference to a desktop phone. The desktop phone 402 can connect to the wireless conference box 404 to add video to an audio call without transferring or reestablishing the entire call. The desktop phone 402 receives video from the remote parties and sends the video to the wireless conference box 404. The desktop phone 402 can also receive one or more packet streams (e.g., video streams and/or audio streams) from a network gateway in the multiparty video conference, for example. The wireless conference box 404 connects to the display 406 to display the video from the remote parties. The display 406 can divide the presentation of video by party, such that video from each remote party is displayed at a different portion of the display. In some embodiments, the wireless conference box 404 connects to multiple displays, and video from each remote party is displayed at a different display. The wireless conference box 404 also includes a camera to capture video. The wireless conference box 404 sends the captured video to the desktop phone 402, so the desktop phone 402 can then send the captured video to the remote parties as part of the video conference. Together, the desktop phone 402, the wireless conference box 404, and the display 406 form a single video conferencing endpoint 400 for a multiparty video conference.

Before sending the captured video to the desktop phone 402, the wireless conference box 404 can encode the video according to a suitable video compression standard, such as H.264. The desktop phone 402 can synchronize the video from the wireless conference box 404 with audio received from the user, and send the synchronized media to the remote parties. In one embodiment, the desktop phone 402 receives the compressed video from the wireless conference box 404, appends network headers, sets lip synchronization attributes with audio from the user, and sends the video to the remote parties in the conference call. When receiving video from the remote parties, the desktop phone 402 can check lip synchronization attributes to determine when to send the video to the wireless conference box 404 for presentation at the display 406, and when to output the corresponding audio received from the remote parties.

The desktop phone 402 and wireless conference box 404 connect directly via wireless. The wireless connection can be a direct, wireless connection based on the 802.11 standards, such as WIFI direct. Moreover, the desktop phone 402 and wireless conference box 404 can "see" each other using standard WIFI protocols. This allows the desktop phone 402 and wireless conference box 404 to automatically connect to each other when both devices are within a wireless range, which enables the desktop phone 402 to seamlessly add video to an audio conference. In addition, the desktop phone 402 and wireless conference box 404 can include a WIFI direct service application for exchanging information, such as information regarding security, video codec, framerate, resolutions, capabilities, etc. This facilitates the seamless connection between the desktop phone 402 and wireless conference box 404, and the integration of video into an audio conference.

In one embodiment, when the desktop phone 402 detects the wireless conference box 404, it asks the user of the desktop phone 402 if the user would like to connect to the wireless conference box 404 in order to add video to the audio conference. If the user accepts, the desktop phone 402 and wireless conference box 404 establish an application-level WIFI direct connection. The desktop phone 402 and wireless conference box 404 can directly communicate over a standard IP connection. The desktop phone 402 then notifies the remote parties of the new video capabilities provided by the wireless conference box 404 and display 406. If the remote parties respond with their own video capabilities, the desktop phone 402 can initiate video by sending a message to the wireless conference box 404 to initialize video in/out. The wireless conference box 404 can then send compressed video frames from the camera to the desktop phone 402. The desktop phone 402 receives the compressed video frames, appends network headers, sets lip synchronization attributes with audio from the user, and sends the video frames to the remote parties. Further, when the desktop phone 402 receives video frames from the remote parties, it checks lip synchronization attributes and, at the appropriate time, sends the video frames to the wireless conference box 404 to be decoded and displayed on the display 406. When the video frames are displayed at the display 406, the desktop phone 402 can output corresponding audio, such that the video frames and corresponding audio are presented in a synchronized manner.

Figure 5:
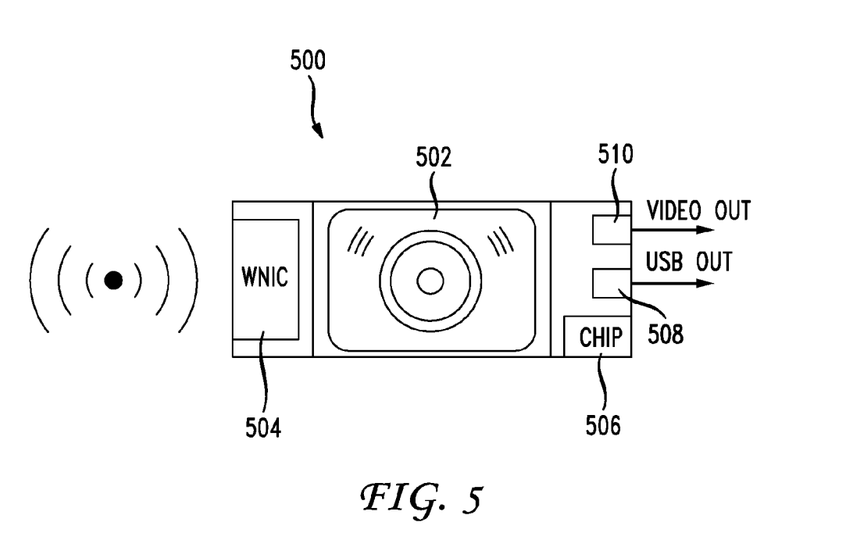
FIG. 5 illustrates an exemplary wireless conference box for adding video to an audio conference.

FIG. 5 illustrates an exemplary wireless conference box 500 for adding video to an audio conference. The wireless conference box 500 can connect to a phone, or any other device capable of supporting an audio call over IP (e.g., VoLTE, VoIP, wireless LAN, etc.), to add video conferencing capabilities to the phone and/or transfer video conferencing functions to the wireless conference box 500. The wireless conference box 500 includes a wireless network interface card 504 for wirelessly communicating with other devices. The wireless conference box 500 can use the wireless network interface card 504 to connect with a phone, or any other audio conferencing device, directly over wireless. The direct wireless connection can be based on 802.11 standards, such as WIFI direct. Moreover, the wireless conference box 500 can detect, and/or be detected by, other wireless devices using standard WIFI protocols. The wireless conference box 500 can also include a WIFI direct service application to wirelessly send and/or receive information such as information regarding security, video codec, framerate, resolutions, capabilities, etc.

The wireless conference box 500 includes a built-in camera 502 for capturing video. In some embodiments, the wireless conference box 500 does not include a built-in camera, but is connected to a separate, external camera. Further, the wireless conference box 500 can include an on-board chip 506 for encoding and decoding video frames. However, in some embodiments, the on-board chip 506 may not be necessary, for example, if an external camera is used that has its own encoder. Here, the wireless conference box 500 may not include the on-board chip 506 when the wireless conference box 500 is used with an external camera that has its own encoder. In some embodiments, the on-board chip 506 can support H.264 multi-stream encoding and decoding. Moreover, the wireless conference box 500 can include a video interface 510, such as HDMI and VGA, to connect to a display device, such as a monitor or a television. Furthermore, the wireless conference box 500 can include a universal serial bus (USB) interface 508 to connect and supply power to other devices, such as digital cameras, network adapters, microphones, speakers, webcams, media players, disk drives, flash drives, input devices, printers, computer peripherals, etc.

The wireless conference box 500 can also connect to other devices, such as displays and cameras, via the wireless network interface card 504, using different wireless protocols. For example, the wireless conference box 500 can connect to a display device, such as a television, using wireless HDMI. As another example, the wireless conference box 500 can use Wireless USB to connect to other devices, such as game controllers, printers, scanners, digital cameras, media players, hard disk drives, flash drives, microphones, speakers, etc.

Figure 6:
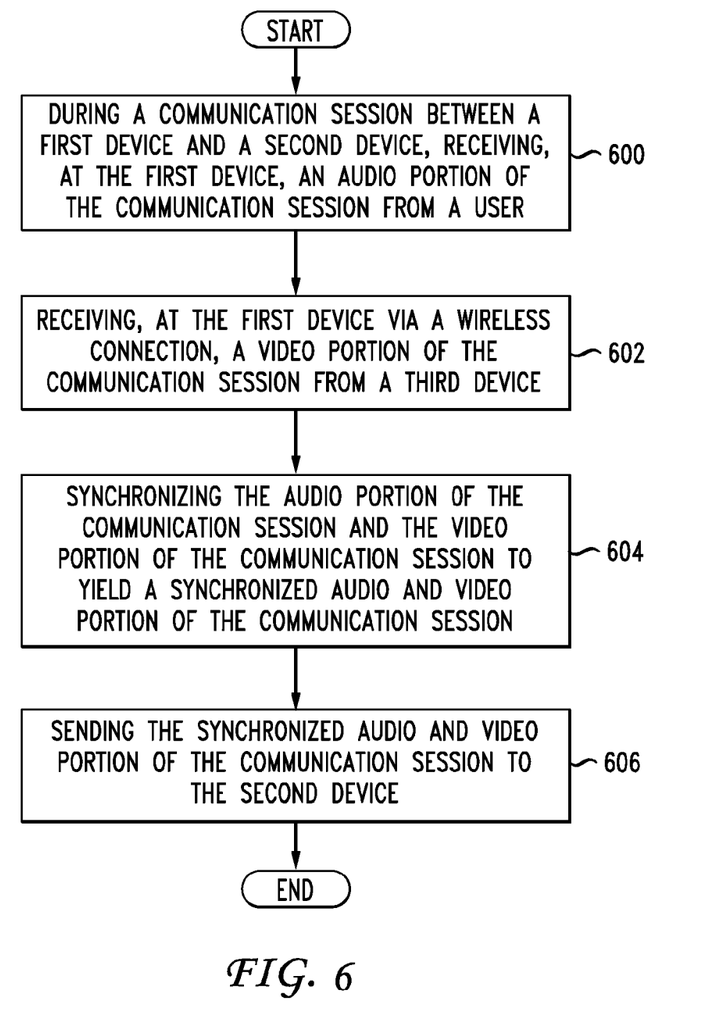
FIG. 6 illustrates an example method embodiment.

Having disclosed some basic system components and concepts, the disclosure now turns to the exemplary method embodiment shown in FIG. 6. For the sake of clarity, the method is described in terms of an exemplary system 100, as shown in FIG. 1, configured to practice the method. The steps outlined herein are exemplary and can be implemented in any combination thereof, including combinations that exclude, add, or modify certain steps.

During a communication session between the system 100 and a second device, the system 100 first receives an audio portion of the communication session from a user (600). The system 100 then receives, via a wireless connection, a video portion of the communication session from a third device (602). The system 100 receives the video portion of the communication session in order to add video to the communication session, or transfer the processing, creation, and/or display of video for an existing video portion of the communication session to the third device. For example, the communication session can be an audio-only communication session, which the system 100 can then expand to include video that the system 100 receives from the third device. To initiate a video portion of the communication session, the system 100 can send a message to the third device to initialize video input and output to establish video capabilities for the communication session. Once the third device initializes video input and output, it can send the video portion of the communication session to the system 100.

The video portion of the communication session can include compressed video frames captured by a camera associated with the third device, such as an internal camera or an external camera. The third device can be any device with wireless capabilities. For example, the third device can be a wireless conferencing gateway that transmits video frames captured from a camera device to the system 100. The third device can also include a video encoder and decoder, a camera, a wireless interface, and/or a video output. The wireless connection can be, for example, a direct wireless connection between the devices. The direct wireless connection can be based on the 802.11 standards, for example. For example, the system 100 and third device can directly connect to each other using a wireless standard such as WIFI Direct. Moreover, the system 100 and third device can do wireless pairing to allow the devices to seamlessly communicate with each other.

The system 100 can receive the video portion of the communication session in response to a request from a user and/or the system 100 to add video to the communication session. For example, the system 100 can receive the video portion of the communication session in response to a message sent by the system 100 to the third device prompting the third device to capture and/or send video frames to the system 100, as part of the communication session. The system 100 can also receive the video portion of the communication session based on a schedule, a condition, a behavior, a preference, a configuration setting, a threshold, an input, etc. Moreover, the system 100 can also receive the video portion of the communication session automatically when the system 100 and third device establish the wireless connection. The system 100 can establish the wireless connection automatically when the third device is within a wireless range, for example. In one embodiment, the system 100 automatically establishes the wireless connection with the third device via WIFI direct, when the third device is within a wireless range. Before establishing the wireless connection, the system 100 can prompt the user of the system 100 to enable/allow the wireless connection. The system 100 can then establish the wireless connection once it receives confirmation/permission from the user. The prompt can be an audio prompt, a video prompt, a text prompt, an email, a text message, an alert, an announcement, a graphical prompt, a sound, an image, and/or a combination thereof. For example, the prompt can be an audible request to establish the wireless connection with the third device.

Alternatively, the system 100 can establish the wireless connection transparently, without prompting the user to enable/allow the wireless connection. Here, the system 100 can establish the wireless connection automatically when the third device is within a wireless range, when the system 100 detects a specific condition and/or behavior, when the system 100 detects a request from the third device, etc. For example, the system 100 can automatically establish the wireless connection when the second device attempts to send video frames to the system 100. The system 100 can also establish the wireless connection based on an input, a schedule, a setting, a threshold, an error, a condition, a preconfigured preference, and so forth. For example, the system 100 can automatically establish the wireless connection if it detects that the video capabilities of the system 100 and/or a display device connected to the system 100 are below a threshold.

Next, the system 100 synchronizes the audio portion of the communication session and the video portion of the communication session to yield a synchronized audio and video portion of the communication session (604). To synchronize the audio and video portions of the communication session, the system 100 can set lip synchronization attributes on the video portion of the communication session with audio from the audio portion of the communication session. Then, the system 100 sends the synchronized audio and video portion of the communication session to the second device (606). The system 100 sends the synchronized audio and video portion of the communication session as part of the communication session between the system 100 and the second device. If the system 100 then receives video and audio frames associated with the communication session from the second device, the system 100 can check lip synchronization attributes on the video frames and, at a time that is based at least in part on the lip synchronization attributes, send the video frames to the third device to be decoded and displayed at the third device. This way, the third device can display the video frames from the second device, while the system 100 outputs corresponding audio frames from the second device, so that the video and audio frames are outputted in a synchronized manner.

The system 100 can also receive additional portions of the communication session from other devices in addition to the third device. For example, if the user of the system 100 wants to move to a location beyond the wireless range of the third device, or if the user simply wants to display the video of the communication session at a different display device, the user can do so by wirelessly connecting the system 100 to a fourth device with wireless capabilities. Here, the system 100 can receive a second portion of the communication session from the fourth device, synchronize the second video portion of the communication session and a corresponding audio portion of the communication session, and send the synchronized audio and video portion of the communication session to the second device. The system 100 can wirelessly connect to the third and/or fourth device when the system 100 detects that the third and/or fourth device is/are within wireless range of the system 100. The system 100 can also connect to other wireless devices to receive other video portions of the communication session, as the user moves to different locations or prompts the system 100 to establish a wireless connection to the other wireless devices, for example.

As the system 100 connects to other wireless devices, it can seamlessly add or transfer video for the communication session without having to transfer or reestablish the entire communication session. The following non-limiting example is illustrative. Bill, a manager who is away on a business trip, calls Andy, one of Bill's employees, on Andy's WIFI direct enabled smartphone. In this example, Bill calls Andy from a WIFI direct enabled smartphone that is connected to a WIFI direct video conferencing device, which is connected to a camera and a monitor. When Andy accepts the call, he is in the breakroom, which does not have a nearby WIFI direct video conferencing device. Accordingly, Andy is initially only able to participate in an audio call with Bill. However, while talking to Bill, Andy returns to his office, where he has a WIFI direct video conferencing device connected to his computer's monitor and webcam. When Andy enters his office, his smartphone detects the WIFI direct video conferencing device and presents Andy with an option to add video to the call through the WIFI direct video conferencing device. Andy then selects the option to add video, which prompts Andy's smartphone to establish a wireless connection to the WIFI direct video conferencing device and initialize video input and output. The WIFI direct video conferencing device adds the video to the call, without reestablishing or transferring the entire call. Moreover, the WIFI direct video conferencing device handles the video to and from Bill's smartphone, while Andy's smartphone handles the audio to and from Bill's smartphone.

Bill then decides that he wants to include Cindy and Earl in the call. Also, Andy decides that he wants to continue the conference with Cindy and Earl in a larger room equipped with a larger display device. Accordingly, Andy gathers Cindy and Earl and walks to the conference room, which has more space and a larger display device, while continuing to talk to Bill from the smartphone. Because Andy did not disable the video conferencing option on his smartphone, the smartphone utilizes WIFI direct to discover nearby WIFI direct video conferencing devices. As Andy walks into the conference room, his smartphone detects the WIFI direct video conferencing device in the conference room and automatically establishes a WIFI direct connection to the WIFI direct video conferencing device. The WIFI direct video conferencing device in the conference room then begins to handle the video to and from Bill's smartphone. The WIFI direct video conferencing device in the conference room sends the video captured from a local camera to Andy's smartphone, and then sends the video to Bill's smartphone. Moreover, the WIFI direct video conferencing device in the conference room can output the video from Bill's smartphone on a large display in the conference room, for all, Andy, Cindy, and Earl, to see. Andy can select a speakerphone option on his smartphone, to allow his smartphone to output the audio from Bill's smartphone through the speakers for Andy, Cindy, and Earl to hear. This way, Andy can transfer the video portion of a conference to a different device without transferring or reestablishing the entire call, while also continuing to participate in the audio portion of the conference.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:
  establishing, via a wireless connection, an audio only communication session between a first device and a second device;
  adding video capabilities to the audio only communication session by sending a message to a third device having video capabilities, the message requesting initialization of video input and output to yield an audio video communication session;
  receiving, via the wireless connection, a video portion and an audio portion of the audio video communication session;
  synchronizing the audio portion of the audio video communication session and the video portion of the audio video communication session to yield a synchronization of the audio and video portion of the audio video communication session; and
  based on the synchronization, sending the video portion of the audio video communication session to a video output component at the third device and the audio portion of the audio video communication session to an audio output at the first device so as to expand capabilities of the audio only communication session from audio only to both audio and video.

2. The method of claim 1, further comprising:
  receiving audio for the audio video communication session via the first device, the audio originating from a user.

3. The method of claim 1, further comprising:
  receiving video outputted from the third device for the audio video communication session, wherein the video comprises compressed video frames captured by a camera associated with the third device; and
  synchronizing the video with audio received from a user at the first device to yield synchronized video and audio for the audio video communication session.

4. The method of claim 1, wherein synchronizing the audio portion of the audio video communication session and the video portion of the audio video communication session comprises setting lip synchronization attributes on the video portion of the audio video communication session with audio from the audio portion of the audio video communication session.

5. The method of claim 1, further comprising:
  receiving video frames associated with the audio video communication session;
  checking lip synchronization attributes on the video frames; and
  at a time that is based at least in part on the lip synchronization attributes, sending the video frames to the third device to be decoded and display at the third device.

6. The method of claim 1, wherein the third device comprises a video decoder and encoder, a camera, and a video output, and wherein the audio portion and the video portion of the audio video communication session are both transmitted via a same network associated with the wireless connection.

7. The method of claim 1, further comprising:
  receiving, from a fourth device, a second video portion of the audio video communication session when the first device is outside of a wireless range of the third device;
  synchronizing the second video portion of the audio video communication session and a corresponding audio portion of the audio video communication session to yield a second synchronized audio and video portion of the audio video communication session, wherein the corresponding audio portion is associated with the first device; and
  sending the second synchronized audio and video portion of the audio video communication session to the second device.

8. The method of claim 1, wherein the first device is a WIFI direct enabled phone, and wherein the wireless connection is a WIFI direct connection.

9. A system comprising:
  a processor; and
  a computer-readable storage medium storing instructions which, when executed by the processor, cause the processor to perform operations comprising:
    establishing, via a wireless connection, an audio only communication session between a first device and a second device;
    adding video capabilities to the audio only communication session by sending a message to a third device having video capabilities, the message requesting initialization of video input and output to yield an audio video communication session;

receiving, via the wireless connection, a video portion and an audio portion of the audio video communication session;

synchronizing the audio portion of the audio video communication session and the video portion of the audio video communication session to yield a synchronization of the audio and video portion of the audio video communication session; and based on the synchronization, sending the video portion of the audio video communication session to a video output component at the third device and the audio portion of the audio video communication session to an audio output at the first device so as to expand capabilities of the audio only communication session from audio only to both audio and video.

10. The system of claim 9, wherein the first device is a WIFI direct enabled phone and the wireless connection is a WIFI direct connection, and wherein the audio portion and the video portion of the audio video communication session are both transmitted via a same network associated with the wireless connection.

11. The system of claim 9, wherein the computer-readable storage medium stores additional instructions which result in operations further comprising:

receiving audio for the audio video communication session via the first device, the audio originating from a user.

12. The system of claim 9, wherein the computer-readable storage medium stores additional instructions which result in operations further comprising:

receiving video frames associated with the audio video communication session;

checking lip synchronization attributes on the video frames;

at a time that is based at least in part on the lip synchronization attributes, sending the video frames to the third device to be decoded and displayed at the third device; and at the time that is based at least in part on the lip synchronization attributes, sending audio frames received for the audio video communication session to an audio output component on the first device, the audio frames being associated with the video frames.

13. The system of claim 9, wherein the video portion of the audio video communication session comprises compressed video frames captured by a camera associated with the third device.

14. The system of claim 9, wherein the third device comprises a video decoder and encoder, a camera, and a video output.

15. The system of claim 9, wherein synchronizing the audio portion of the audio video communication session and the video portion of the audio video communication session comprises setting lip synchronization attributes on the video portion of the audio video communication session with audio from the audio portion of the audio video communication session.

16. A non-transitory computer-readable storage medium storing instructions which, when executed by a processor, cause the processor to perform operations comprising:

establishing, via a wireless connection, an audio only communication session between a first device and a second device;

adding video capabilities to the audio only communication session by sending a message to a third device having video capabilities, the message requesting initialization of video input and output to yield a video audio communication session;

receiving, via the wireless connection, a video portion and an audio portion of the audio video communication session;

synchronizing the audio portion of the audio video communication session and the video portion of the audio video communication session to yield a synchronization of the audio and video portion of the audio video communication session; and based on the synchronization, sending the video portion of the audio video communication session to a video output component at the third device and the audio portion of the audio video communication session to an audio output at the first device so as to expand capabilities of the audio only communication session from audio only to both audio and video.

17. The non-transitory computer-readable storage medium of claim 16, wherein the first device is a WIFI direct enabled phone, and wherein the wireless connection is a WIFI direct connection.

18. The non-transitory computer-readable storage medium of claim 16, storing additional instructions which result in the method further comprising:

receiving audio for the audio video communication session via the first device, the audio originating from a user.

19. The non-transitory computer-readable storage medium of claim 16, storing additional instructions which result in operations further comprising:

receiving video frames associated with the audio video communication session;

checking lip synchronization attributes on the video frames at a time that is based at least in part on the lip synchronization attributes, sending the video frames to the third device to be decoded and displayed at the third device; and at the time that is based at least in part on the lip synchronization attributes, sending audio frames received for the audio video communication session to an audio output component on the first device, the audio frames being associated with the video frames.

20. The non-transitory computer-readable storage medium of claim 16, wherein the third device comprises a video decoder and encoder, a camera, and a video output.

* * * * *